3,268,599
PROCESS FOR THE PREPARATION OF CYCLO
(α-PERFLUORO-DI-p-XYLYLENES)
Sui-Wu Chow, Bridgewater Township, Somerset County,
N.J., assignor to Union Carbide Corporation, a corporation of New York
No Drawing. Filed July 9, 1964, Ser. No. 381,566
11 Claims. (Cl. 260—649)

This invention relates to a process for the preparation of cyclic α-perfluoro-di-p-xylylenes. More particularly, this invention relates to a pyrolytic process for the preparation of cyclic α-perfluoro-di-p-xylylenes which process has been materially simplified so that intermediary steps first requiring the preparation of sulfones are now avoided.

The present application is a continuation-in-part of prior application bearing Serial No. 310,868, filed September 23, 1963, now abandoned.

The outstanding physical properties of the para-xylylene polymer family have prompted extensive efforts to enable their convenient preparation. Although these polymers have excellent thermal and chemical stability, the presence of —$CH_2$— groups adjacent to the aromatic ring provide potentially vulnerable sites for atmospheric attack. In order to strengthen these weak positions, it has been found desirable to replace the active hydrogen atoms with more stable substituent groups such as fluorine.

Heretofore, the only available methods for producing α-perfluorinated-p-xylylene polymers was by the pyrolytic decomposition of bis-sulfone compounds having the general structure

wherein R is an alkyl group having between about 1–6 carbon atoms or a phenyl. Decomposition of the above bis-sulfones, however, results in the spontaneous evolution of sulfur dioxide and formation of by-products which results in pressure fluctuations which, in turn, complicate the vacuum deposition of the polymer.

Accordingly, it is an object of the present invention to provide a process for the preparation of a precursor of α-fluoro-p-xylylene polymers, which, when pyrolyzed, will not liberate sulfur dioxide or otherwise complicate the vacuum deposition process.

It is another object of this invention to provide an improved process for the preparation of cyclic α-perfluoro-di-p-xylylenes which employs more conveniently obtainable precursors than heretofore possible.

Now in accordance with the present invention, cyclic α-perfluoro-di-p-xylylene having the structural formula

is produced by the process which comprises forming a reactive intermediary p-xylylene diradical having the basic structure

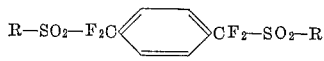

by the pyrolysis at temperatures between about 700° C.–1000° C. of compounds having the general formula

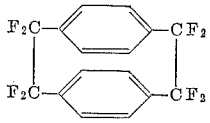

wherein Y is a halogen having a lower bond strength than fluorine such as bromine, chlorine, and iodine, and Y' is a member selected from the group consisting of hydrogen and a halogen having a lower bond strength than fluorine and $n$ is an integer from 1 to 2 inclusive, and cooling and condensing the thus formed diradicals in intimate admixture with a fluid medium containing an inert organic solvent maintained at a temperature above about 50° C.

The α-perfluoro-p-xylene precursor compound having the formula

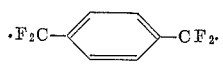

wherein Y and Y' are as defined above and $n$ has a value of 1, can be prepared from known α,α,α',α'-tetrafluoro-p-xylenes by halogenating said tetrafluoro-p-xylene. When $n$ has a value of two, these α-tetrafluoro-p-xylenes may also be designated as 1,2-bis(α,α-difluoro-p-tolyl)tetrafluoroethanes. Upon halogenation, these compounds are converted to 1,2-bis(α-halo - α,α - difluoro-p-tolyl)tetrafluoroethane. Halogenation of these α-tetrafluoro - p-xylenes can be accomplished by introducing a halogen substituent having a lower bond strength than the fluorine already present in the alpha position. For example, when α,α,α',α'-tetrafluoro-p-xylene is employed, halogens such as chlorine, bromine, or iodine can be employed in the Y and/or Y' positions since they have lower bond strengths than fluorine.

When the α-perfluoro-p-xylenes having the structure

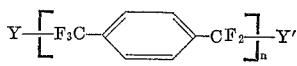

wherein $n$ has a value of two and Y and Y' are as above, are utilized to obtain the cyclic dimer, they can be conveniently prepared by halogenating 1,2-bis(α,α-difluoro-p-tolyl)tetrafluoroethane. The required 1,2-bis(α,α-difluoro-p-tolyl)tetrafluoroethane can be prepared by dissolving 1,2-di(p-tolyl)tetrafluoroethane in a solution of acetic acid, acetic anhydride and a strong mineral acid. Generally, any strong mineral acid may be used; such as concentrated sulfuric acid, hydrochloric acid, phosphoric acid, sulfonic acid and so forth. This solution is then cooled to a temperature of between about 0° C. to 10° C. Good results are obtained when the solution is cooled to a temperature of between about 0° C. to 5° C. and this temperature range is preferred. To the cooled solution is slowly added an oxidizing agent. Normally, any oxidizing agent can be used which is capable of oxidizing the 1,2-di(p-tolyl)tetrafluoroethane to the corresponding aldehyde stage. Generally, tertiary butyl chromates, chromium trioxide, and the like are satisfactory oxidizing agents for this purpose.

The oxidized solution is then poured into ice water and the resultant product is isolated by filtration, washed with water and dissolved in an organic solvent. The organic solvent employed is selected from the group of organic solvents which are capable of acting as solvents when hot but which will release the solute when cold. Among the organic solvents which can be utilized are hexane, ethyl alcohol, isopropyl, heptane and the like.

Recrystallization of the solute from the organic solvent will yield 1,2-bis(α,α-diacetoxy-p-tolyl)tetrafluoroethane.

The 1,2-bis(α,α-diacetoxy-p-tolyl)tetrafluoroethane is then fluorinated to obtain the 1,2-bis(α,α-difluoro-p-tolyl)tetrafluoroethane. This can be accomplished by mixing it with sulfur tetrafluoride and heating. The resulting product is then dissolved in methylene chloride, washed with water and dried. Evaporation of the solvent yields 1,2 - bis(α,α - difluoro-p-tolyl)tetrafluoroethane which is further purified by recrystallization from an organic solvent in the same manner as described immediately hereinabove.

The 1,2-bis(α,α-difluoro-p-tolyl)tetrafluoroethane can now be halogenated in the same manner as described hereinabove. These halogenation reactions have been found to proceed well when a mixture of either of the above p-xylene precursors, a halogenating agent, such as gaseous chloride, N-bromo-succinimide, and the like, and an inert organic solvent are irradiated with ultraviolet light while the mixture is maintained at the reflux temperature of the solvent. However, it should be understood that, while this halogenating process is preferred, other halogenating techniques can also be successfully employed.

The pyrolytic cleaving of the p-xylene precursors result in the formation of a reactive intermediary diradical having the basic structure

In this process, the reactive intermediary diradicals may be prepared by pyrolyzing a compound having the structure

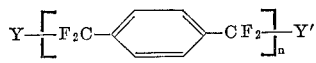

where $n$, Y and Y′ are as described above, at a temperature of between about 700° C. to about 1000° C., and preferably at a temperature about 750° C. to about 950° C. At such temperatures, essentially quantitative yields of the reactive intermediary diradical are secured. Operation at temperatures of less than about 700° C. serves only to increase the reaction time and lessen the yield of the cyclic dimer. At temperatures above about 1000° C., some charring of the reactive intermediary diradicals is occasioned which undesirably affects the resultant yield of product.

Low partial pressures of the $\alpha,\alpha'$-dihalo-$\alpha,\alpha,\alpha'\alpha'$-tetrafluoro-p-xylenes and the 1,2-bis($\alpha$-halo-$\alpha,\alpha$-difluoro-p-tolyl)tetrafluoroethanes are desirable in this process; preferably, such that the partial pressure of the said compounds is between about 0.001 and 50 mm. Hg, with optimum conditions generally being secured at partial pressures of between about 1 to 20 mm. Hg.

While the presence of an inert vaporous diluent in the pyrolysis process is not critical, it is often desirable for use in this process in order to reduce the partial pressure of the $\alpha,\alpha'$-dihalo-$\alpha,\alpha,\alpha',\alpha'$-tetrafluoro-p-xylenes or the 1,2-bis($\alpha$-halo-$\alpha,\alpha$-difluoro-p-tolyl)tetrafluoroethanes and make it possible to operate at high total pressures. Steam is a particularly desirable inert diluent and has a protective effect in preventing charring of the p-xylylene precursors. Other inert diluents such as nitrogen, argon, and like inert gases can also be employed. Thus, the total pressure of the system depends on the desired operating partial pressure of the p-xylylene precursors, and the amount of steam and/or other diluents employed. When no diluents are employed, the pyrolysis reaction is preferably carried out at total pressures of less than about 10 mm. Hg. When diluents are employed it is possible to operate in this process at total pressures even up to atmospheric pressure or higher.

The amount of steam present as a diluent and carrier gas is not critical but, when employed, it is preferably present in an amount of at least about 20 moles per mole of p-xylylene precursor employed and generally between about 50 to 200 moles per mole of α-perfluoro-p-xylylene, although excess steam is not detrimental to the process.

Condensation of the α-perfluoro-p-xylylene diradicals into the α-perfluoro-di-p-xylyene is accomplished in the presence of an organic solvent. In order to remove the residual heat from the pyrolysate vapors without distilling or vaporizing the organic solvent, it is preferred that the reactive intermediary diradicals be cooled to about 200°–400° C. but at a temperature above the ceiling condensation-polymerization temperature of the reactive intermediary diradicals. Cooling to below the ceiling condensation temperatures, in the absence of the organic solvent, causes almost spontaneous polymerization of the reactive intermediary diradicals into poly(α-perfluoro-p-xylylene). This ceiling condensation temperature is generally between 25° C. and 200° C. depending somewhat on the pressure. However, in the vaporous state, the reactive intermediary diradicals are relatively stable and do not polymerize.

The cooling of the pyrolysate vapors can be accomplished in accordance with any one of several convenient means. For instance, internal or external condensers, cooling coils, tubes or the like can be employed immediately after the pyrolysis zone, or, if desired, natural cooling created by long runs of air-cooled tubing or piping from the pyrolysis zone to the condensing medium can be used. It is also possible to mix the organic solvent condensing medium in the vapor state with the pyrolysate vapors in a suitable manner or by mixing directly in the chamber as another method.

It is essential in this process that the condensation of the cooled vaporous diradicals be carried out in the presence of a fluid medium of an inert organic solvent. Illustrative of such organic solvents are those such as p-xylene, benzene, toluene, o-xylene, m-xylene, cumene, methylnaphthalene, o-dichlorbenzene, 1,2-di-p-tolylethane, mineral oil, diphenylmethane, 1,2-diphenylethane, heptane, decahydronaphthalene, and the like and preferably those having an atmospheric boiling point between about 50° and 250° C.

The α-perfluoro-di-p-xylylene product forms upon the condensation of the vaporous diradicals in the presence of the fluid medium. It is not essential, however, that the fluid medium be in the liquid state. While this is most desirable the condensation can be accomplished equally as well by mixing the pyrolysate vapors with the vaporous organic solvent and then simultaneously condensing the total mixture to the liquid state for recovery.

When the cooled pyrolysate vapors of the reactive α-perfluoro diradicals are collected in a liquid medium, merely bubbling or dispersing the vapor below the liquid level of the organic solvent is an adequate means by which the α-perfluoro-p-xylylene diradicals can be caused to dimerize to the α-perfluoro-di-p-xylylene and the resultant α-perfluoro-di-p-xylylene product be subsequently recovered from the solvent solution. The bath into which these vapors are condensed may be maintained at any temperature above 50°C. but preferably between a temperature from 50° C. to 250° C.

Bath temperatures below 50° C. are considered undesirable and burdensome to maintain. The heat of condensation and cooling given off by the pyrolysate vapors act to conveniently maintain the organic solvent at temperatures above about 50° C. It has been found that conversion of the diradicals to the polymer is increased when the bath temperatures fall below about 50° C. Therefore, to avoid competing reactions and decreased yield of the cyclic dimer, it is considered preferable to maintain the temperature of the bath between about 50° C. and 250° C. Thus, when employed herein, the term "fluid media" is intended to cover both the liquid or gaseous state of the solvent medium in which the pyrolysate vapors are collected.

Recovery of the α-perfluoro-di-p-xylylene is relatively simple. It can, for instance, be readily recovered by subliming it from high boiling solvents such as mineral oil. Preferably, however, a desirable method is to remove most of a lower boiling solvent medium by distillation and then crystallize the α-perfluoro-di-p-xylylene from the remaining solvent by cooling and filtering off the crystallized α-perfluoro-di-p-xylylene, although other recovery techniques can also be successfully employed.

In a preferred embodiment of this invention, an α-perfluor-p-xylylene having the structure

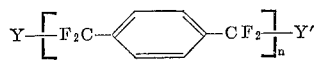

wherein $n$ has a value of either one or two, Y is a halogen having a lower bond strength than fluorine and Y' is a member selected from the group consisting of hydrogen and halogens having a lower bond strength than fluorine is added to a mixing zone wherein it is mixed with steam and passed through a pyrolysis tube maintained at temperatures of between about 700° C. and 950° C. The hot pyrolysate vapors are cooled in a condenser at the outlet of the pyrolysis tube to a temperature of between about 150°–250° C. The cooled vapors are then passed into a hot organic solvent bath which is maintained at temperatures of from between about 80°–90° C. by the hot pyrolysate wherein the diradicals condense to form the cyclic dimer, α-perfluoro-di-p-xylylene.

Either continuously or in stages, the aqueous layer of the condensation medium is removed and the solution concentrated by flashing or reduced pressure distillation to about one-tenth its original volume. Upon cooling, the α-perfluoro-di-p-xylylene, which crystallized from the organic solution in high purity, is then separated from the mother liquor by filtration or by centrifugation, washed and dried.

Poly(α-perfluoro-p-xylylenes) can be prepared by the pyrolytic cleavage of the α-perfluoro-di-p-xylylenes of the present invention.

In the pyrolytic polymerization process, the reactive diradicals are prepared by pyrolyzing an α-perfluoro-di-p-xylylene at a temperature of less than about 700° C. and preferably at a temperature of between about 550° C. to about 650° C. At such temperatures, essentially quantitive yields of the reactive diradicals are secured. Pyrolysis of the cyclic dimer, α-perfluoro-di-p-xylylene, begins at about 450° C. regardless of the pressure employed. Operation in the range of 450°–550° C. serves only to increase the reaction time and lessen the yield of polymer secured. At temperatures above 700° C., cleavage of the substituent group can occur, resulting in a tri- or polyfunctional species causing cross-linking or highly branched polymers.

Pyrolysis temperature is essentially independent of the operating pressure. It is, however, preferred that reduced or subatmospheric pressures be employed. For most operations, pressures within the range of 0.0001 to 10 mm. Hg absolute are most practical. However, if desired, inert vaporous diluents such as nitrogen, argon, carbon dioxide, steam and the like can be employed to vary the optimum temperature of the pyrolysis or to change the total effective pressure in the system.

In the polymerization process, the diradicals condense and polymerize nearly instantaneously at the condensation temperature of the diradicals. The coupling of these diradicals involves such low activation energy and the chain propagation shows little or no preference as to the particular diradical, that steric and electronic effects are not important as they are in vinyl polymerization. Thus, substituted and/or unsubstituted α-perfluoro-p-xylylene homopolymers can be made by cooling the diradicals down to any temperature below the condensation temperature of the diradicals. It has been observed that for each diradical species, there is an optimum ceiling condensation temperature above which the diradicals will not condense and polymerize. All observed ceilings of α- and ring substituted p-xylylene diradicals have been below 200° C., but have been noted to vary to some degree depending upon the operating pressure involved. For example, at 0.5 mm. Hg pressure, the following condensation and polymerization ceilings are observed for the following diradicals:

| | ° C. |
|---|---|
| p-Xylylene | 25–30 |
| α-Perfluoro-p-xylylene | 30–40 |
| 2-chloro-p-xylylene | 70–80 |
| 2-cyano-p-xylylene | 120–130 |
| 2-n-butyl-p-xylylene | 130–140 |
| 2-iodo-p-xylylene | 180–200 |

Thus, by this process, homopolymers are made by maintaining the substrate surface at a temperature below the ceiling condensation temperature of the particular diradical specie involved, or desired, in the homopolymer. This is most appropriately termed "homopolymerizing conditions."

Where several different diradicals are present in the pyrolyzed mixture having different vapor pressures and condensation characteristics, as for example, α-perfluoro-p-xylylene and ring substituted p-xylylene species, or any other mixture with other substituted diradicals, homopolymerization will result when the condensation and polymerization temperature is selected to be at or below that temperature where only one of the diradicals will condense and polymerize. Thus, for purposes within this application, the term "under homopolymerization conditions" is intended to include those conditions where only homopolymers are formed. Therefore, it is possible to make homopolymers from a mixture containing one or more of the substituted diradicals when any other diradicals present have different condensation or vapor pressure characteristics, and wherein only one diradical specie is condensed and polymerized on the substrate surface. Of course, other diradical species not condensed on the substrate surface can be drawn through the system, in vaporous form, to be condensed and polymerized in a subsequent cold trap.

It is also possible to obtain α-perfluoro-p-xylylene copolymers through the pyrolysis process described hereinabove. Copolymers of α-perfluoro-p-xylylene and ring substituted α-perfluoro-p-xylylene diradicals, as well as copolymers of substituted α-perfluoro-p-xylylene diradicals, wherein the substituted group are all the same diradicals but wherein each diradical contains a different number of substituent groups, can all be obtained through the said pyrolysis process. Moreover, it is also possible to obtain copolymers of α-perfluoro-p-xylylene and other p-xylylene species having no α-substitution, such as p-xylylene, and those ring-substituted species whose condensation temperatures are listed above. Copolymerization is also possible with different α-perhalogenated species.

Copolymerization occurs simultaneously with condensation upon cooling the vaporous mixture of reactive diradicals to a temperature below about 200° C. under polymerization conditions. Copolymers can be made by maintaining the substrate surface at a temperature below the ceiling condensation temperature of the lowest boiling diradical desired in the copolymers; such as, at room temperature or below. This is considered "copolymerizing conditions," since at least two of the diradicals will condense and copolymerize in a random copolymer at such temperature.

The polymers can be readily recovered from the polymerization zone by any convenient means, depending upon the particular zone employed. When a cold surface, such as a condenser, is employed as the polymerization zone, the polymer can be removed from the wall of the zone by mechanical stripping or other suitable means. Condensation of the diradical in a water sprayer or under the surface of an aqueous medium recovers the polymer in particular form which can then be separated by filtration and drying by conventional means prior to fabrication.

The following examples are set forth as merely being illustrative of the present invention and are not intended to be construed as limitative thereof. Unless otherwise specified, all percentages and parts are by weight.

EXAMPLE 1

*Preparation of α,α'-dibromo-α,α,α',α'-tetrafluoro-p-xylene*

α,α,α',α'-Tetrafluoro-p-xylene was prepared by the method of Hasek et al., J. Am. Chem. Soc. 82, 543 (1960), by the reaction of terephthaldehyde with sulfur tetrafluoride at temperatures of about 150° C.

0.15 mole of α,α,α',α'-tetrafluoro-p-xylene, as prepared above, was admixed with 0.33 mole of N-bromosuccinimide and 320 parts of carbon tetrachloride. The mixture was irradiated with an ultraviolet lamp while maintained at the reflux temperature of the solvent. The precipitated succinimide was removed by filtration and the filtrate was distilled to give 0.12 mole of α,α'-dibromo-α,α,α',α'-tetrafluoro-p-xylene having the structural formula

and a boiling point of 102°–107° C. at 25 mm. Hg.

The compound was subjected to infrared analysis which showed the characteristic —CF$_2$— absorptions at 9.2 and 9.4 microns. The presence of the bromine substituents was confirmed by elemental analysis of the compound and by hydrolysis of the compound to terephthalic acid with silver acetate in aqueous acetic acid solution.

EXAMPLE 2

*Preparation of α,α'-dichloro-α,α,α',α'-tetrafluoro-p-xylene*

A solution of 10.17 grams of α,α,α',α'-tetrafluoro-p-xylene as prepared in Example 1 in 100 milliliters of carbon tetrachloride was irradiated with an ultraviolet lamp. The solution was maintained at reflux by the heat from the lamp. Chlorine was then passed into the solution until the color of the chlorine remained in the solution. This amounted to about 9 grams of chlorine. Irradiation was continued for an additional 30 minutes. The excess chlorine was purged from the solution by a stream of argon. Distillation of the reaction solution gave 11.6 grams of α,α'-dichloro-α,α,α',α'-tetrafluoro-p-xylene having a boiling point of 86–90° C. at 34 millimeters Hg.

The compound was subject to infrared analysis which showed the characteristic —CF$_2$— absorption at 9.2 and 9.4 microns. The presence of the chlorine substituents was confirmed by hydrolysis of the compound to terephthalic acid with silver acetate in aqueous acetic acid solution.

EXAMPLLE 3

*Preparation of α-perfluoro-di-p-xylylene*

7.0 grams of α,α'-dibromo-α,α,α',α'-tetrafluoro-p-xylene as prepared in Example 1 was added dropwise over a period of two hours to a quartz pyrolysis tube maintained at 800° C. by a high temperature furnace surrounding said quartz tube. Steam generated from distilled water was admixed with the α,α'-dibromo-α,α,α',α'-tetrafluoro-p-xylene before entering the pyrolysis zone. The hot pyrolysate, upon reflux from the pyrolysis tube, was absorbed in toluene maintained at 80°–90° C. Evaporation of the toluene solution gave an oily mixture which, upon dilution with hexane, prepicitated 0.160 gram of a solid. The hexane solution on distillation gave 2.22 grams of recovered α,α'-dibromo-α,α,α',α'-tetrafluoro-p-xylene. The solid product on recrystallization and sublimation gave 0.073 gram of the cyclic dimer, α-perfluoro-di-p-xylylene having a melting point of 263–7° C. representing a yield of 5.8% based on unrecovered starting material.

The infrared analysis of the compound when compared with a standard analysis obtained by the pyrolysis of an α,α'-bis(alkyl sulfonyl)α,α,α',α'-tetrafluoro-p-xylene was found to be superimposable proving the compounds were structurally identical. Moreover, a mixed melting point determination employing the compound obtained above and a standard obtained by pyrolysis of a bis-sulfone showed no depression, thus confirming the structure.

EXAMPLE 4

Table I presented hereinbelow illustrates further examples of the preparation of α-perfluoro-di-p-xylylene prepared in a manner identical with that described in Example 3.

TABLE I

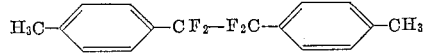

| | Pyrolysis Temp. (° C.) |
|---|---|
| Y=Y'=Br | 800 |
| Y=Y'=Br | 850 |
| Y=Y'=Cl | 950 |
| Y=Br, Y'=H | 850 |
| Y=Cl, Y'=H | 950 |

EXAMPLE 5

*Preparation of 1,2-bis(α,α-difluoro-p-tolyl) tetrafluoroethane*

A solution, consisting of 35 grams of 1,2-di(p-tolyl) tetrafluoroethane having the chemical structure

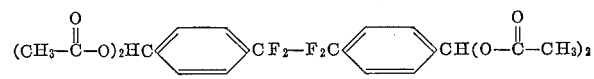

and 50 milliliters of concentrated sulfuric acid in 500 milliliters of acetic acid and 500 milliliters of acetic anhydride, was cooled to a temperature of between about 0° C. to 5° C. While the solution was maintained at this temperature, 66 grams of chromium trioxide was added to the solution in small amounts over a period of one hour and the solution was gently agitated by stirring for an additional two hours. The reaction mixture was then poured into ice water. The resultant product was isolated by filtration and the filter cake thoroughly washed with water and a solution of 5% sodium carbonate in water in order to remove the acids and chromic salts. While the product can be effectively washed by water alone, use of a weak basic solution, such as sodium hydroxide, potassium hydroxide and the like, materially speeds up the process. The product was next dissolved in a sufficient amount of hot ethyl acetate-methanol and permitted to recrystallize by cooling to obtain 1,2-bis(α,α-diacetoxy-p-tolyl)tetrafluoroethane which has the chemical structure:

$$(CH_3-\overset{O}{\underset{\|}{C}}-O)_2HC\hspace{-2pt}\diagup\hspace{-8pt}\diagdown\hspace{-2pt}CF_2-F_2C\hspace{-2pt}\diagup\hspace{-8pt}\diagdown\hspace{-2pt}CH(O-\overset{O}{\underset{\|}{C}}-CH_3)_2$$

0.005 mole of the 1,2-bis(α,α-diacetoxy-p-tolyl)tetrafluoroethane was then mixed with 0.1 mole of sulfur tetrafluoride and two drops of water in a 110 milliliter capacity stainless steel rocker bomb. The rocker bomb was then heated at 150° C. for a period of ten hours. The resultant product obtained was dissolved in a sufficient amount of methylene chloride to cause it to go into solution and then thoroughly washed by agitation in a solution of water and 5% sodium carbonate in water. The methylene chloride was removed by evaporation and the resultant product dissolved in hot hexane. Recrystallization from the hexane yielded 1,2-bis(α,α-difluoro-p-tolyl)tetrafluoroethane which has the chemical structure:

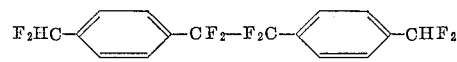

EXAMPLE 6

*Preparation of 1,2-bis(α-bromo-α,α-di-fluoro-p-tolyl) tetrafluoroethane*

A solution consisting of 14.0 grams of 1,2-bis(α,α-difluoro-p-tolyl)tetrafluoroethane, 28.5 grams of N-bromosuccinimide and 200 milliliters of carbon tetrachloride was irradiated for about 5 days with a Hanovia mercury lamp at reflux temperature. The resultant mixture was filtered to remove precipitated succinimide and the carbon tetrachloride solution was then evaporated to obtain the crude product. Recrystallization of the crude product from hexane yielded 1,2-bis(α-bromo-α,α-difluoro-p-tolyl)tetrafluoroethane which has the chemical structure:

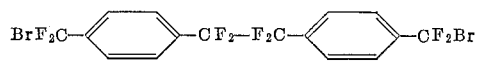

EXAMPLE 7

*Preparation of 1,2-bis(α-chloro-α,α-difluoro-p-tolyl)tetrafluoroethane*

Excess gaseous chlorine in an amount of 21 grams was passed into a solution consisting of 7.08 grams 1,2-bis(α,α-difluoro-p-tolyl)tetrafluoroethane in 100 milliliters of carbon tetrachloride. As the chlorine was introduced into the solution, the mixture was irradiated at reflux temperature with a Hanovia lamp, until the solution revealed an excess of chlorine as indicated by the typical chlorine-green color. The excess chlorine from the mixture was purged with a stream of argon and the solvent was then evaporated. The resultant product, which was recrystallized from hexane in the same manner as described in Example 5 above, yielded 1,2-bis(α-chloro-α,α-difluoro-p-tolyl)tetrafluoroethane having the chemical structure:

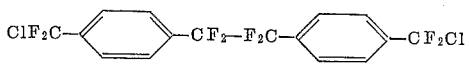

EXAMPLE 8

*Preparation of 1,2-bis(p-trifluoromethylphenyl)tetrafluoroethane*

The following example illustrates that the bromine-carbon bond is actually split in the bromo-difluoromethyl group having the configuration

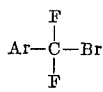

wherein Ar is an aryl group.

In a pyrolysis tube, which was heated to a temperature of 850° C., was distilled 3.55 grams of α-bromo-α,α,α',α',α'-pentafluoro-p-xylene. The resulting pyrolysate was cooled successively with a water-cooled condenser and Dry Ice-acetone cooled receivers. From the water-cooled condenser was obtained 0.517 gram of a crystalline material while 2.0 grams of unreacted α-bromo-α,α,α',α',α'-pentafluoro-p-xylene was obtained from the Dry Ice-acetone cooled receivers. The crystalline product was recrystallized from hexane in the same manner as described in Example 5 above. Elemental and Nuclear Magnetic Resonance spectral analyses showed the product to be 1,2-bis(p-trifluoromethylphenyl)tetrafluoroethane having a melting point of 115° C. and the chemical structure:

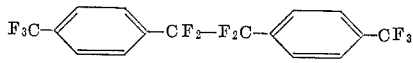

The elemental analysis, as calculated for $C_{16}H_8F_{10}$, was as follows:

Calculated _____ 49.24% C, 2.07% H, 48.69% F
Found _____ 49.01% C, 2.26% H, 48.27% F

EXAMPLE 9

*Preparation of α-octafluoro-di-p-xylylene*

3.0 grams of the dibromide product formed in accordance with Example 6 above was mixed with 25 milliliters of chlorobenzene. The mixture was diluted with steam in a ratio of about 20 to 50 parts of steam to one part of the dibromide product and introduced into a pyrolysis tube for a period of over two hours; the temperature of the pyrolysis tube being at 850° C. The pyrolysate vapors were absorbed in toluene which was at a temperature of 85° C. Next, the toluene solution was evaporated and the resultant product recrystallized from chloroform-hexane. Upon recrystallization, the resultant product sublimed to yield α-octafluoro-di-p-xylylene.

Confirmation of the product obtained was made by vapor phase chromatography and infrared spectrum. The product was superimposable upon the product obtained from Example 3 above thereby confirming its structure.

EXAMPLE 10

*Preparation of α-octafluoro-di-p-xylylene*

A solution consisting of 5.0 grams of the product formed in accordance with Example 7 in 25 milliliters of chlorobenzene was admixed with steam in the same manner and in the same ratio as in Example 9. The mixture was introduced into a pyrolysis tube which was maintained at a temperature of 750° C. for two hours. The pyrolysate vapors were absorbed in toluene which was at a temperature of 85° C. The toluene solution was evaporated and the resultant product recrystallized from hexane as in Example 9. Upon recrystallization, the resultant product sublimed to yield α-octafluoro-di-p-xylylene.

Confirmation of the product obtained was made by infrared spectrum and by comparison to the structure of the product obtained in Example 3 in similar fashion as in Example 9 above.

EXAMPLE 11

*Preparation of poly(α-perfluoro-p-xylylene)*

An α-octaperfluoro-di-p-xylylene, or di(α,α,α',α'-tetrafluoro-p-xylylene) as it can also be called, as prepared in Examples 3, 9, and 10 was charged to a quartz pyrolysis tube which was maintained at 650° C. by a high temperature furnace surrounding said tube. The pyrolysis tube led into a water cooled condenser and the entire system was maintained under a reduced pressure of 0.01 millimeter Hg. The hot pyrolysate formed during the pyrolysis was condensed on the walls of the water-cooled condenser to form a polymeric film of poly(α-perfluoro-p-xylylene) which could be stripped from the glass surface. Comparison of the infrared spectra of the film with that of a standard obtained by the pyrolysis of an α,α'-bis-(alkyl sulfonyl)α,α,α',α'-tetrafluoro-p-xylylene showed that they were superimposable and thus identical.

These polymers have been found to exhibit excellent solvent resistance and thermal stability. These polymers are especially desirable in films, surface coatings, electrical insulation and other similar applications, particularly where high resistance to thermal and chemical deterioration is necessary.

For example, copper wires upon which poly(α-perfluoro-p-xylylene) has been vapor deposited provide excellent electrical conductors having an integral insulating coating thereon which is highly resistant to environmental deterioration. Moreover, when fibrous materials such as paper or cloth are impregnated with the vapor deposited polymer, the wet strength of the material is significantly increased. The materials thus impregnated may now be employed in atmospheres wherein thermal and chemical deterioration would have made their prior use impossible to any practical degree.

While the invention has been described in detail and with particularity, it should be understood that changes and modifications may be made in the methods, processes, steps and compositions described herein without departing from the scope and spirit of the invention as contained in the appended claims.

What is claimed is:

1. A process for the preparation of cyclic α-perfluoro-di-p-xylylene having the structure

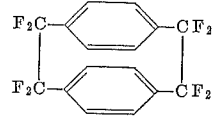

which comprises, pyrolyzing at temperatures of between about 700° C. to 1000° C., and at a partial pressure of between about 0.001 mm. Hg and 50 mm. Hg a compound in the vaporous state, said compound having the general formula

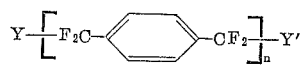

wherein Y is a halogen having a lower bond strength than that of fluorine, Y' is a member selected from the group consisting of hydrogen and halogens having a lower bond strength than that of fluorine, and $n$ is an integer from 1 to 2 inclusive, cooling and bringing the thusly pyrolyzed vapor in intimate admixture with an inert orgainc solvent maintained at a temperature of from about 50° C. to about 250° C. and recovering said cylic α-perfluoro-di-p-xylylene from said solvent.

2. The process of claim 1 wherein the inert organic solvent is introduced as a vapor and the total mixture is simultaneously condensed to the liquid state for recovery.

3. The process as defined in claim 1 wherein the pyrolysis temperature is between about 750° C. and about 950° C.

4. The process as defined in claim 1 wherein the pressure is between about 1.0 mm. Hg and 20 mm. Hg.

5. The process as defined in claim 1 wherein an inert vaporous diluent is employed.

6. The process as defined in claim 5 wherein the inert vaporous diluent is steam.

7. A process for the preparation of cyclic α-perfluoro-di-p-xylylene having the structure

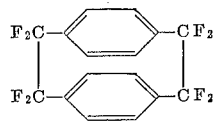

which comprises, pyrolyzing at temperatures between about 700° C. and 1000° C., and at a partial pressure of between about 0.001 mm. Hg and 50 mm. Hg, a compound in the vaporous state, said compound having the general formula

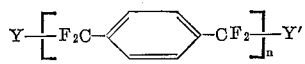

wherein Y is a halogen having a lower bond strength than that of fluorine, Y' is a member selected from the group consisting of hydrogen and halogens having a lower bond strength than that of fluorine and $n$ is an integer from 1 to 2 inclusive, said compound being introduced into the pyrolysis zone in intimate admixture with an inert vaporous diluent, cooling and bringing the thusly pyrolyzed vapors in intimate admixture with an inert organic solvent whose temperature is maintained from between about 50° C. to 250 C. and recovering said cyclic α-perfluoro-di-p-xylylene from said solvent.

8. The process of claim 5 wherein the inert organic solvent is introduced as a vapor and the total mixture is simultaneously condensed to the liquid state for recovery.

9. The process as defined in claim 7 wherein the pressure is between about 1.0 mm. Hg and 20 mm. Hg.

10. The process as defined in claim 7 wherein the pyrolysis temperature is between about 750° C. and about 950° C.

11. The process as defined in claim 7 wherein the inert vaporous diluent is steam.

References Cited by the Examiner

FOREIGN PATENTS 1,085,673  7/1960  Germany.

OTHER REFERENCES

Pellegrin: "Trav. Chim. Pays-Bas," vol. 18, pp. 457–65 (1899).

LEON ZITVER, *Primary Examiner.*

K. H. JOHNSON, K. V. ROCKEY, *Assistant Examiners.*